US007076049B2

(12) United States Patent
Bushey et al.

(10) Patent No.: US 7,076,049 B2
(45) Date of Patent: *Jul. 11, 2006

(54) METHOD OF DESIGNING A TELECOMMUNICATIONS CALL CENTER INTERFACE

(75) Inventors: Robert R. Bushey, Austin, TX (US);
Gregory W. Liddell, Austin, TX (US);
John M. Martin, Austin, TX (US);
Theodore Pasquale, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 13 days.

This patent is subject to a terminal disclaimer.

(21) Appl. No.: 10/882,183

(22) Filed: Jul. 2, 2004

(65) Prior Publication Data

US 2004/0240635 A1 Dec. 2, 2004

Related U.S. Application Data

(63) Continuation of application No. 09/532,038, filed on Mar. 21, 2000, now Pat. No. 6,778,643.

(51) Int. Cl.
*H04M 3/00* (2006.01)

(52) U.S. Cl. .............................. 379/265.01; 379/266.07

(58) Field of Classification Search ............. 379/88.18, 379/112.06, 133, 265.01, 111, 88.16, 88.22, 379/265.02, 265.12, 266.01, 266.07; 705/1, 705/9, 10
See application file for complete search history.

(56) References Cited

U.S. PATENT DOCUMENTS

| 4,310,727 A | 1/1982 | Lawser | 379/211.02 |
| 4,694,483 A | 9/1987 | Cheung | 379/265.06 |
| 4,761,542 A | 8/1988 | Kubo et al. | 235/379 |
| 4,922,519 A | 5/1990 | Daudelin | 379/88.01 |
| 4,930,077 A | 5/1990 | Fan | 704/8 |
| 4,964,077 A | 10/1990 | Eisen et al. | 345/707 |
| 5,115,501 A | 5/1992 | Kerr | 707/9 |
| 5,181,259 A | 1/1993 | Rorvig | 382/225 |
| 5,204,968 A | 4/1993 | Parthasarathi | 345/707 |

(Continued)

FOREIGN PATENT DOCUMENTS

WO 00/33548 6/2000

(Continued)

OTHER PUBLICATIONS

Kelly, "From Intelligent Call Routing to Intelligent Contact Management," *Call Center Solutions*, vol. 19, No. 3, 4 pages, Sep. 2000.

(Continued)

*Primary Examiner*—Ovidio Escalante
(74) *Attorney, Agent, or Firm*—Greenblum & Bernstein, P.L.C.

(57) ABSTRACT

A method is provided for designing an interface system. The method includes receiving a call from a customer at a call center, and logging a reason the customer is calling the call center. Subsequently, reasons from multiple customers are collected and categorized into task categories to be performed by the interface system. Menu options can then be designed based upon the task categories. The menu options include some of the language the customers used to express the reason for calling the call center. Performance of the interface system is evaluated by using cumulative response time (CRT), which is a total time a user interfaces with the system, and routing accuracy. The routing accuracy accounts for whether the user successfully navigated the interface system to a correct destination, whether the user navigated to an incorrect destination, and whether the user did not navigate to any destination.

14 Claims, 5 Drawing Sheets

U.S. PATENT DOCUMENTS

| | | | |
|---|---|---|---|
| 5,206,903 A | 4/1993 | Kohler et al. | 379/265.12 |
| 5,263,167 A | 11/1993 | Conner, Jr. et al. | 707/4 |
| 5,299,260 A | 3/1994 | Shaio | 379/266.07 |
| 5,311,422 A | 5/1994 | Loftin et al. | 703/2 |
| 5,323,452 A | 6/1994 | Dickman et al. | 379/201.04 |
| 5,327,529 A | 7/1994 | Fults et al. | 345/762 |
| 5,335,268 A | 8/1994 | Kelly, Jr. et al. | 379/112.05 |
| 5,335,269 A | 8/1994 | Steinlicht | 376/266.05 |
| 5,371,673 A | 12/1994 | Fan | 704/1 |
| 5,388,198 A | 2/1995 | Layman et al. | 345/812 |
| 5,420,975 A | 5/1995 | Blades et al. | 345/811 |
| 5,479,488 A | 12/1995 | Lennig et al. | 379/88.04 |
| 5,495,567 A | 2/1996 | Iizawa et al. | 345/762 |
| 5,500,795 A | 3/1996 | Powers et al. | 705/11 |
| 5,519,772 A | 5/1996 | Akman et al. | 379/221.08 |
| 5,530,744 A | 6/1996 | Charalambous et al. | 376/266.08 |
| 5,533,107 A | 7/1996 | Irwin et al. | 379/201.01 |
| 5,535,321 A | 7/1996 | Massaro et al. | 345/707 |
| 5,537,470 A | 7/1996 | Lee | 379/265.11 |
| 5,553,119 A | 9/1996 | McAllister et al. | 379/88.01 |
| 5,561,711 A | 10/1996 | Muller | 379/266.08 |
| 5,566,291 A | 10/1996 | Boulton et al. | 345/709 |
| 5,586,060 A | 12/1996 | Kuno et al. | 702/179 |
| 5,586,171 A | 12/1996 | McAllister et al. | 379/88.02 |
| 5,586,219 A | 12/1996 | Yufik | 706/14 |
| 5,594,791 A | 1/1997 | Szlam et al. | 379/265.09 |
| 5,600,781 A | 2/1997 | Root et al. | 345/745 |
| 5,615,323 A | 3/1997 | Engel et al. | 345/440 |
| 5,633,909 A | 5/1997 | Fitch | 379/29.01 |
| 5,657,383 A | 8/1997 | Gerber et al. | 379/266.01 |
| 5,659,724 A | 8/1997 | Borgida et al. | 707/3 |
| 5,666,400 A | 9/1997 | McAllister et al. | 379/88.01 |
| 5,668,856 A | 9/1997 | Nishimatsu et al. | 379/88.18 |
| 5,671,351 A | 9/1997 | Wild et al. | 714/38 |
| 5,675,707 A | 10/1997 | Gorin et al. | 704/257 |
| 5,684,870 A | 11/1997 | Maloney et al. | 379/212.01 |
| 5,684,872 A | 11/1997 | Flockhart et al. | 379/266.08 |
| 5,706,334 A | 1/1998 | Balk et al. | 379/88.13 |
| 5,710,884 A | 1/1998 | Dedrick et al. | 709/217 |
| 5,727,950 A | 3/1998 | Cook et al. | 434/350 |
| 5,729,600 A | 3/1998 | Blaha et al. | 379/266.07 |
| 5,734,709 A | 3/1998 | DeWitt et al. | 379/221.15 |
| 5,740,549 A | 4/1998 | Reilly et al. | 705/14 |
| 5,757,644 A | 5/1998 | Jorgensen et al. | 700/83 |
| 5,758,257 A | 5/1998 | Herz et al. | 725/116 |
| 5,771,276 A | 6/1998 | Wolf | 379/88.16 |
| 5,790,117 A | 8/1998 | Halviatti et al. | 715/744 |
| 5,793,368 A | 8/1998 | Beer | 345/347 |
| 5,802,526 A | 9/1998 | Fawcett et al. | 707/104.1 |
| 5,806,060 A | 9/1998 | Borgida et al. | 707/3 |
| 5,808,908 A | 9/1998 | Ghahramani | 702/182 |
| 5,809,282 A | 9/1998 | Cooper et al. | 709/226 |
| 5,812,975 A | 9/1998 | Komori et al. | 704/256 |
| 5,819,221 A | 10/1998 | Kondo et al. | 704/255 |
| 5,821,936 A | 10/1998 | Shaffer et al. | 345/810 |
| 5,822,397 A | 10/1998 | Newman | 379/27.02 |
| 5,822,744 A | 10/1998 | Kesel | 706/52 |
| 5,825,856 A | 10/1998 | Porter et al. | 379/93.12 |
| 5,825,869 A | 10/1998 | Brooks et al. | 379/265.12 |
| 5,832,428 A | 11/1998 | Chow et al. | 704/254 |
| 5,832,430 A | 11/1998 | Lleida et al. | 704/256 |
| 5,835,565 A | 11/1998 | Smith et al. | 379/27.04 |
| 5,848,396 A | 12/1998 | Gerace | 705/10 |
| 5,864,605 A | 1/1999 | Keshav | 379/88.01 |
| 5,864,844 A | 1/1999 | James et al. | 707/4 |
| 5,870,308 A | 2/1999 | Dangelo et al. | 716/18 |
| 5,872,865 A | 2/1999 | Normile et al. | 382/224 |
| 5,873,068 A | 2/1999 | Beaumont et al. | 705/14 |
| 5,884,029 A | 3/1999 | Brush, II et al. | 709/202 |
| 5,899,992 A | 5/1999 | Iyer et al. | 707/7 |
| 5,903,641 A | 5/1999 | Tonisson | 379/265.12 |
| 5,905,774 A | 5/1999 | Tatchell et al. | 379/88.04 |
| 5,920,477 A * | 7/1999 | Hoffberg et al. | 382/181 |
| 5,923,745 A | 7/1999 | Hurd | 379/265.02 |
| 5,943,416 A | 8/1999 | Gisby | 379/265.13 |
| 5,953,406 A | 9/1999 | LaRue et al. | 379/265.01 |
| 5,963,965 A | 10/1999 | Vogel | 715/501.1 |
| 5,974,253 A | 10/1999 | Nahaboo et al. | 717/105 |
| 5,991,735 A | 11/1999 | Gerace | 705/10 |
| 5,999,611 A | 12/1999 | Tatchell et al. | 379/211.02 |
| 5,999,908 A | 12/1999 | Abelow | 705/1 |
| 6,014,638 A | 1/2000 | Burge et al. | 705/27 |
| 6,016,336 A | 1/2000 | Hanson | 379/88.23 |
| 6,026,381 A | 2/2000 | Barton, III et al. | 705/35 |
| 6,032,129 A | 2/2000 | Greef et al. | 705/27 |
| 6,035,283 A | 3/2000 | Rofrano | 705/27 |
| 6,035,336 A | 3/2000 | Lu et al. | 709/232 |
| 6,038,560 A | 3/2000 | Wical | 707/5 |
| 6,044,355 A | 3/2000 | Crockett et al. | 705/8 |
| 6,052,693 A | 4/2000 | Smith et al. | 707/104.1 |
| 6,055,542 A | 4/2000 | Nielsen et al. | 707/104.1 |
| 6,058,163 A | 5/2000 | Pattison et al. | 379/265.06 |
| 6,058,179 A | 5/2000 | Shaffer et al. | 379/220.01 |
| 6,058,435 A | 5/2000 | Sassin et al. | 719/331 |
| 6,061,433 A | 5/2000 | Polcyn et al. | 379/93.12 |
| 6,067,538 A | 5/2000 | Zorba et al. | 706/47 |
| 6,088,429 A | 7/2000 | Garcia | 379/88.22 |
| 6,099,320 A | 8/2000 | Papadopoulos | 434/322 |
| 6,104,790 A | 8/2000 | Narayanaswami | 379/93.25 |
| 6,128,380 A | 10/2000 | Shaffer et al. | 379/265.01 |
| 6,134,315 A | 10/2000 | Galvin | 379/219 |
| 6,134,530 A | 10/2000 | Bunting et al. | 705/7 |
| 6,148,063 A | 11/2000 | Brennan et al. | 379/72 |
| 6,157,808 A | 12/2000 | Hollingsworth | 434/350 |
| 6,160,877 A | 12/2000 | Tatchell et al. | 379/197 |
| 6,161,130 A | 12/2000 | Horvitz et al. | 709/206 |
| 6,163,607 A | 12/2000 | Bogart et al. | 379/266.01 |
| 6,166,732 A | 12/2000 | Mitchell et al. | 345/733 |
| 6,170,011 B1 | 1/2001 | Beck et al. | 709/224 |
| 6,173,053 B1 | 1/2001 | Bogart et al. | 379/266.01 |
| 6,173,279 B1 | 1/2001 | Levin et al. | 707/5 |
| 6,201,948 B1 | 3/2001 | Cook et al. | 434/350 |
| 6,212,502 B1 | 4/2001 | Ball et al. | 704/270 |
| 6,219,665 B1 | 4/2001 | Shiomi | 707/6 |
| 6,230,197 B1 | 5/2001 | Beck et al. | 709/223 |
| 6,236,955 B1 | 5/2001 | Summers | 703/6 |
| 6,236,990 B1 | 5/2001 | Geller et al. | 707/5 |
| 6,243,375 B1 | 6/2001 | Speicher | 370/352 |
| 6,249,579 B1 | 6/2001 | Bushnell | 379/356.01 |
| 6,263,052 B1 | 7/2001 | Cruze | 379/88.18 |
| 6,269,153 B1 | 7/2001 | Carpenter et al. | 379/88.02 |
| 6,278,976 B1 | 8/2001 | Kochian | 704/500 |
| 6,282,404 B1 | 8/2001 | Linton | 434/350 |
| 6,289,084 B1 | 9/2001 | Bushnell | 379/67.1 |
| 6,292,909 B1 | 9/2001 | Hare | 714/40 |
| 6,295,551 B1 | 9/2001 | Roberts et al. | 704/205 |
| 6,296,376 B1 | 10/2001 | Kondo et al. | 362/310 |
| 6,308,172 B1 | 10/2001 | Agrawal et al. | 707/5 |
| 6,330,326 B1 | 12/2001 | Whitt | 379/265.13 |
| 6,332,154 B1 | 12/2001 | Beck et al. | 709/204 |
| 6,336,109 B1 | 1/2002 | Howard | 706/25 |
| 6,349,290 B1 | 2/2002 | Horowitz et al. | 705/35 |
| 6,353,661 B1 | 3/2002 | Bailey, III | 379/93.25 |
| 6,353,825 B1 | 3/2002 | Ponte | 707/5 |
| 6,357,017 B1 | 3/2002 | Bereiter et al. | 714/27 |
| 6,366,879 B1 | 4/2002 | Coxhead et al. | 704/201 |
| 6,374,260 B1 | 4/2002 | Hoffert et al. | 707/104.1 |
| 6,389,400 B1 | 5/2002 | Bushey et al. | 705/7 |
| 6,389,403 B1 | 5/2002 | Dorak, Jr. et al. | 705/52 |
| 6,389,538 B1 | 5/2002 | Gruse et al. | 713/194 |
| 6,400,807 B1 | 6/2002 | Hewitt et al. | 379/88.11 |
| 6,405,149 B1 | 6/2002 | Tsai et al. | 702/49 |
| 6,405,159 B1 | 6/2002 | Bushey et al. | 703/13 |

| | | | |
|---|---|---|---|
| 6,405,170 B1 | 6/2002 | Phillips et al. | 704/270 |
| 6,411,687 B1 | 6/2002 | Bohacek et al. | 379/88.21 |
| 6,434,714 B1 | 8/2002 | Lewis et al. | 714/38 |
| 6,448,980 B1 | 9/2002 | Kumar et al. | 345/745 |
| 6,483,523 B1 | 11/2002 | Feng | 715/745 |
| 6,487,277 B1 | 11/2002 | Beyda et al. | 379/88.01 |
| 6,516,051 B1 | 2/2003 | Sanders | 379/10.03 |
| 6,564,197 B1 | 5/2003 | Sahami et al. | 706/55 |
| 6,598,022 B1 | 7/2003 | Yuschik | 704/375 |
| 6,618,715 B1 | 9/2003 | Johnson et al. | 706/47 |
| 6,694,482 B1 | 2/2004 | Arellano et al. | 715/500.1 |
| 2001/0014863 A1 | 8/2001 | Williams, III | 705/1 |
| 2001/0041562 A1 | 11/2001 | Elsey et al. | 455/414.3 |
| 2002/0055868 A1 | 5/2002 | Dusevic et al. | 705/9 |
| 2002/0133394 A1 | 9/2002 | Bushey et al. | 705/10 |
| 2002/0196277 A1 | 12/2002 | Bushey et al. | 345/745 |
| 2003/0026409 A1 | 2/2003 | Bushey et al. | 379/211.02 |
| 2003/0143981 A1 | 7/2003 | Kortum et al. | 455/414.1 |
| 2003/0156133 A1 | 8/2003 | Martin et al. | 345/747 |
| 2003/0156706 A1 | 8/2003 | Koehler et al. | 379/265.05 |
| 2003/0158655 A1 | 8/2003 | Obradovich et al. | 701/207 |
| 2004/0006473 A1 | 1/2004 | Mills et al. | 704/270 |
| 2004/0032935 A1 | 2/2004 | Mills et al. | |
| 2004/0042592 A1 | 3/2004 | Knott et al. | 379/88.16 |

FOREIGN PATENT DOCUMENTS

| | | |
|---|---|---|
| WO | 00/73968 | 12/2000 |

OTHER PUBLICATIONS

"Call Center Roundup," *Teleconnect*, 10 pages, Dec. 1998.

"Call Centers: Sales, Service and Competitive Advantage," *Canadian Business*, vol. 70, No. 2, 8 pages, Feb. 1997.

Foster, "Advanced Definity Call Centers: Working for You and Your Customers," *AT&T Technology*, vol. 9, No. 2, 7 pages, Summer 1994.

Card, S.K., et al., "The Psychology of Human-Computer Interaction", Hillsdale, NJ: Lawrence Erlbaum, 1983.

Hart, S.G., et al. "Development of the NASA-TLX (Task Load Index): Results of Empirical and Theoretical Research". In P.A. Hancock and N. Meshkati (Eds.), *Human Mental Workload*. (pp. 139-183) Amsterdam: North-Holland, 1988.

John, B.E., et al. "Using GOMS for User Interface Design and Evaluation: Which technique?", ACM Transactions on Computer-Human Interaction, 3 (4). 287-319, 1996.

Shingledecker, C.A. "Operator Strategy: A Neglected Variable in Workload Assessment". The American Psychological Association, Division 21 Symposium on "Mental Workload Measurement: The Theory Application Interface." Montreal, Quebec, Canada: American Psychological Association, 1980.

Wei, Z.G. "Mental Load and Performance at Different Automation Levels."The Netherlands: Delft University, 1997. Applicants particularly call the Examiner's attention to pp. 28-38.

Wierwille, W.W., et al. "Recommendations for Mental Workload Measurement in a Test and Evaluation Environment." Human Factors, 35 (2), 263-281, 1993.

Ameritech Corp., "Ameritech Phone-Based UI Standards: Dialogue Design," <http://www.ameritech.com/corporate/testtown/library/standard/pbix4.html>, 1998.

InterVoiceBrite, Inc., "AgentConnect Call Center Platform Brochure," no date available.

ACD Learning Center Tutorial Series, ACD Call Center Online Learning Center, http://www.call-center.net/ivr-series.htm.

"Customer Management Technology", TeleTech,<http://www.teletech.com/solutions/cmt.htm>, printed on Dec. 18, 2001.

"Products & Services—Interactive Voice Response (IVR)," Prairie Systems, http://www.prairiesys.com/PSI/p_s_interactive_sol.htm.

"RVS Voice," iMessaging Systems, Inc., http://www.imessagingsystems.com/imsprods/rvsvoice/rvsvoice.htm.

"What's Next in Interactive Voice Response," International Nortel Networks Meridian Users Group, <http://www.innmug.org/information/kirvan.html>, InnTouch, Dec. 2000.

Kobayashi, K., "Information Presentation based on Individual User Interests," Second International Conference, IEEE, pp. 375-383, Apr. 1998.

Sgouros, N., "Dynamic Dramatization of Multimedia Story Presentations", 1997 ACM, pp. 87-94.

Murtaugh, M., "The Automatist Storytelling System," Massachusetts Institute of Technology, Masters Thesis, 1996.

Brooks, K.M., "Do Story Agents Use Rocking Chars: The Theory and Implementation of One Model for Computational Narrative," Proceedings of the Fourth ACM International Multimedia conference on Intelligent User Interfaces, ACM Press 1996.

Szekely, P., "Retrospective and Challenges for Model-Based Interface Development," USC Information Sciences Institute, 1996.

Maybury, M., "Automating the Generation of Coordinated Multimedia Explanations," Intelligent Multi-Media Interfaces, AAAI/MIT Press, Cambridge, MA, 1993, Chapter 5: Fiener, S.K., et al..

Stanfield, C. et al., "Toward Memory-Based Reasoning", Communications of the ACM, vol. 29, No. 12, ACM Press, Dec., 1986.

Orwant, J., "Doppelgänger Goes To School: Machine Learning for User Modeling", MIT MS Thesis Sep., 1993.

Orwant, J., "For want of a bit the user was lost: Cheap user modeling", IBM Systems Journal, vol. 35, Nos. 3 & 4, pp. 398-416, 1996.

Shardanand, U., "Social Information Filtering for Music Recommendation," MIT MS Thesis, Sep. 1994.

Maes, P., "From Animals to Animats 2: Proceedings of the Second International Conference on Simulation of Adaptive Behavior, Behavior Based Artificial Intelligence," MIT Media Laboratory 1992.

Kellner, A. et al., "PADIS—An Automatic Telephone Switchboard and Directory Information System," *Speech Communication*, Oct. 1997.

Carpenter, B. et al., "Natural Language Call Routing : a Robust, Self-Organising Approach," *Lucent Technologies Bell Laboratories*, 1998.

Press release dated Dec. 3, 1997, "Lucent Technologies Announces Trial of Natural Language Call Routing Technology".

Riccardi, G. et al., "A Spoken Language System for Automated Call Routing," *1997 IEEE International Conference on Acoustics, Speech, and Signal*.

U.S. Appl. No. 09/578,904 to Bushey et al.

U.S. Appl. No. 09/578,723 to Bushey et al.

Lieberman, Henry, et al., "Let's Browse: A Collaborative Web Browsing Agent," Jan. 5-8, 1999, Proceeding of IUI 99, CPP Conference Paper, 5 pages.

* cited by examiner (Each data point on the plot represents a single task averaged across subjects)

Figure 5

When finished with this call, please complete the following three questions.

A. "With this automated system, I was confident that my call would be routed to the correct department."

Please circle the box below how much you agree or disagree with the above statement.

| 1 | 2 | 3 | 4 | 5 | 6 | 7 |
|---|---|---|---|---|---|---|
| Strongly Agree | Somewhat Agree | Slightly Agree | Neutral | Slightly Disagree | Somewhat Disagree | Srongly Disagree |

B. "This automated system provided menu choices that matched why I was calling."

Please circle the box below how much you agree or disagree with the above statement.

| 1 | 2 | 3 | 4 | 5 | 6 | 7 |
|---|---|---|---|---|---|---|
| Strongly Agree | Somewhat Agree | Slightly Agree | Neutral | Slightly Disagree | Somewhat Disagree | Srongly Disagree |

C. "If I have to call your company in the future, I would want to use this automated system."

Please circle the box below how much you agree or disagree with the above statement.

| 1 | 2 | 3 | 4 | 5 | 6 | 7 |
|---|---|---|---|---|---|---|
| Strongly Agree | Somewhat Agree | Slightly Agree | Neutral | Slightly Disagree | Somewhat Disagree | Srongly Disagree |

D. Name the best feature and name the worst feature of this system.

Best: _____  Worst: _____

E. Overall, which system did you like best?

METHOD OF DESIGNING A TELECOMMUNICATIONS CALL CENTER INTERFACE

This application is a continuation of U.S. patent application Ser. No. 09/532,038, filed Mar. 21, 2000, now U.S. Pat. No. 6,778,643 the disclosure of which is expressly incorporated herein by reference in its entirety.

BACKGROUND OF THE INVENTION

1. Field of the Invention

The present invention relates to a customer-centric approach to interface design (C-CAID) such as for Interactive Voice Response (IVR) systems. The customer-centric approach to IVR menu design produces menu options that closely match the various tasks that customers are trying to accomplish when they are accessing an IVR system. The menu options are grouped and ordered by the frequency of the occurrence of specific customer's tasks, and they are worded in the language used by the customer to facilitate customer understanding of the actual choice provided.

2. Description of the Related Art

Every year, millions of customers call various customer service centers looking for assistance with various tasks that they want to accomplish or looking for answers to various inquiries. The end goal for both the customer and the customer service center is to route the customer's call to an organizational representative who can best accomplish the customer's task, while minimizing the number of misdirected calls. Presently, most customer calls are answered by an IVR whose primary function is to direct the call to an appropriate service center. To get a specific call to the correct center, the customers have to map or correlate their reason for calling onto the applicable IVR menu choices.

A major shortcoming of many of the present prior art interface design methods is that these methods simply map customer service departments onto an organizational hierarchy and allocate tasks to these departments based upon this organizational structure. Interface design is often accomplished with little or no empirical data or user centered methodology to guide the design process. If there is a department that handles new accounts, "New Accounts" becomes a menu option and incoming calls are routed to that department. The remaining services provided by the various organizational service centers are allocated accordingly. The interface design is forcibly fit onto the existing organizational structure.

Another shortcoming of this approach is that many of the organizational structure names do not translate easily into language constructs that a user would readily understand. For example, a service organization entitled "High Speed Internet Access Modalities" when converted into a menu option would not convey the same information content to the average user as "Ordering a new ISDN Line".

The underlying problem common to all of the prior art systems is that there is no user data or user information input into systems development in the early design stages. The resulting user interface merely mirrors an organization and there is no customization or optimization folded into the design of the interface. The resulting menu is simply imposed on the user with no consideration or forethought for what are the actual requirements of the user or how to best address the needs of the user.

The goal of an effective interface design methodology is to use as much user input as possible to ensure that users are presented with choices that they need and are able to understand, while simultaneously minimizing and potentially eliminating unproductive time spent looking at and having to choose between selections that do not address or solve the specific problems that customers want solved or addressed. The choice of style, type, structure and language used in the interface design all have a significant impact upon performance.

In contrast to traditional methods of interface design, the current methodology takes into consideration end-user task frequency and applies the language of the user in the design of the interface menu options. It is much easier for a user to understand and make an intelligent and informed selection of a requested service or task in their own words and in the language of more common usage, rather than listening to recitations of technical jargon and organization-specific descriptions. In a conventional system, a user may have to hazard a guess (with the resulting possibility of an incorrect guess) as to which category applies to their particular situation. Such guessing is minimized by the present interface design method.

Therefore, a method is needed to design an interface that maximizes the performance of the users during operation, reduces misrouted calls, and ensures that the users arrive at their desired destination after successfully (i.e., rapidly and directly) navigating through the menuing system. The present customer centric design methodology has been shown to improve system performance by mapping the user's task representations to the task options of the user interface. The C-CAID approach allows customers to make the correct menu option selection and reach the correct service department without requiring additional assistance or intervention from an operator or customer service representative.

Following the C-CAID approach results in a user interface that the customer can easily understand and successfully navigate. In other words, the interface according to the present invention is designed to be customer friendly. This increases system performance, reduces operational costs, improves customer satisfaction, and leads to general improvements in overall efficiency.

SUMMARY OF THE INVENTION

Accordingly, the present invention is directed to a method for designing a user interface and taking into consideration the user's input in mapping the specific tasks to the interface.

It is an object of the present invention to provide a customer-centric method for designing a menu based option interface. Accordingly, the present invention provides for identifying, categorizing, producing, using, evaluating and comparing the system interface by employing usability tests with actual user task performance data to optimize the system user interface.

The present invention is directed to a method for designing an interface system comprising identifying reasons for a user to interact with the interface system, categorizing the reasons into task categories based at least upon commonality of subject matter, producing menu options based upon the task categories, and organizing the menu options based upon the frequency of occurrence of the task categories.

The method is further directed to evaluating the designed interface system utilizing usability tests to optimize the interface system. Further, the usability tests compare menu options of the designed interface system with an existing interface system. Yet further, evaluating comprises identifying ineffective task categories and menu option combinations.

According to further features of the invention, producing the menu options comprises utilizing customer-centric terminology to produce the menu options and the identified reasons are mapped to an associated menu option that addresses responses to queries represented by the reasons.

According to a feature of the present invention, the interface system comprises an interactive Voice Response (IVR) system.

Additionally, identifying reasons addresses the reasons why a user may access the interface system and defines a relationship between tasks related to the reasons and menu options.

According to a feature of the present invention, the organization of menu options locates the high frequency tasks earlier in the sequence of menu options.

Further, a prediction model based upon expected user task volume and task frequency is utilized to provide an indication of how an interface system will perform. In addition, the cumulative response time (CRT) and routing accuracy are used to evaluate performance of the interface system.

The present invention is directed to a method for designing an interface system, comprising utilizing reasons a user is interfacing with a system to define tasks, determining frequency of task occurrence, categorizing tasks in accordance with the frequency of task occurrence, and utilizing the categorized tasks to design an interface system options menu.

According to a further feature, the tasks are categorized based upon task frequency and call volume.

Additionally, user relevant terms are used in the menu options.

Further, evaluating the performance of the interface system can be by use of an analytic scoring model.

Additionally, utilizing of the categorized tasks can include grouping and ordering the menu options in accordance with a frequency of task occurrence.

Yet further, the menu options can be ordered so that higher frequency tasks are positioned higher in the sequence of options.

Additionally, a prediction model based upon expected user task volume and task frequency can be utilized to provide an indication of how the interface system will perform.

According to the present invention, cumulative response time (CRT) and routing accuracy can be used to evaluate performance of the interface system.

The present invention also is directed to an interface system for performing tasks related to a user's reasons for interacting with the interface system, the interface system including an ordered set of menu options, wherein the order of the menu options of the set of menu options is determined in accordance with task frequency and each menu option is defined in terms of customer relevant terminology.

Additionally, the menu options can represent tasks categorized according to task frequency and call volume.

Furthermore, the interface can comprise an interactive voice response system.

The foregoing objects are achieved by the present invention. Additional features and advantages of the present invention will be set forth in the description to follow, or may be learned by practice of the invention. The objectives and other advantages of the invention will be realized and attained by the methods particularly pointed out in the written description and claims hereof, together with the appended drawings.

In the following description, the C-CAID of the present invention will be described as applied to a IVR for a telecommunication company small business call center. However, the C-CAID design approach of the present invention is not-limited in application to small business call center IVR design. The present design approach may be used in any organization or business unit and is not limited to telephone or telecommunications companies. It can be used for any type of company or governmental unit having need for an interface such as an IVR with which others, such as members of the public (i.e., users) can readily and efficiently interact.

In addition to the IVR system described in this specification, the C-CAID approach may be used to design any man/machine interface, such as one between a computer and a computer operator. In particular this method is also directly applicable to the design of an internet web site map. The C-CAID model can be applied to a wide variety of interface types and modalities. C-CAID could be applied to the design of any human and machine interface such as merely as a non-limiting example, a computer menuing system, an airline reservation system, an on-line shopping or electronic commerce web site, etc.

The C-CAID methodology could also be used in optimizing the interface between two or more machines or devices. In particular this method is also directly applicable to the design of an internet web site map. C-CAID could be used to identify those machine tasks that occur at a greater relative frequency than others and the system could be designed to focus on these tasks and optimize their operations. For example, additional processing power and reallocation of greater memory resources to perform these higher frequency-of-occurrence tasks could be input into the system design.

The C-CAID methodology used in/by the present invention is organization and system independent. Further, it should be noted that the data assembled, processed and folded into an IVR design can be updated as often as the designer or organization wants. In other words, the IVR can be updated yearly, quarterly, weekly, etc. The system can also be adapted to acquire data and measurement parameters in real time and correspondingly adapt the interface dynamically in light of the acquired information.

It is to be understood that both the foregoing general description and the following detailed description are only exemplary and explanatory, rather than limiting, and are intended to provide further explanation of the invention as claimed.

The accompanying drawings are included to provide a further understanding of the invention and are incorporated in and constitute a part of this specification, illustrating one embodiment of the invention. The drawings, together with the description, serve to explain the principles of the invention.

BRIEF DESCRIPTION OF THE DRAWINGS

The present invention is illustrated by way of example, and not by way of limitation, by the figures of the accompanying drawings in which like reference numerals refer to similar elements, and in which:

FIG. 5. shows a Sample questionnaire.

DETAILED DESCRIPTION OF THE INVENTION

The C-CAID process provides a statistically optimized and validated design methodology based upon empirical data support to help a design team apply the needs and desires of the user to the design of interface options.

Studies have shown that customers are generally task oriented. As an illustrative example, a recent study showed that all the customers knew the reasons why they were a calling a specific center (they knew their task), but less than half knew for which department to ask. Also, about half the customers who did ask for a specific department guessed and these guesses were incorrect.

Consequently, customers who are able to map (i.e. correlate) their reason for calling (i.e. their task) directly to an IVR menu option get routed to the correct call center. Customers who cannot correctly map their task to the corresponding menu option might well make an incorrect selection and generate a misdirected call, which wastes resources for both the customer and the organization utilizing the IVR.

When applying the customer-centric approach to IVR design, it is very important to define IVR menu options using customer-relevant terms that are extracted or derived from real-world scenarios. This ensures that the users can understand the menu options and consequently make an intelligent and informed decision as to what they need and where best to satisfy that need in the overall system. To assure that technical terms will be understandable and salient to users, data must be collected from the various call/service centers to design the menu options using the customer's own wording.

Initially, when a first iteration of the customer-centric design is complete, one must evaluate its potential performance through an analytic scoring model. The customer-centric menu options tend to be combinations of the various task categories. The analytic scoring model uses several customer statements for each of the task categories used in the design process and determines the percentage of those statements that map to the corresponding option. The menu designer is trying to map a sample of the original statements of purpose onto the menu options to facilitate comprehension for a high percentage of customers. This allows the customer to readily ascertain the most pertinent menu option related to their specific needs.

Figure 1:
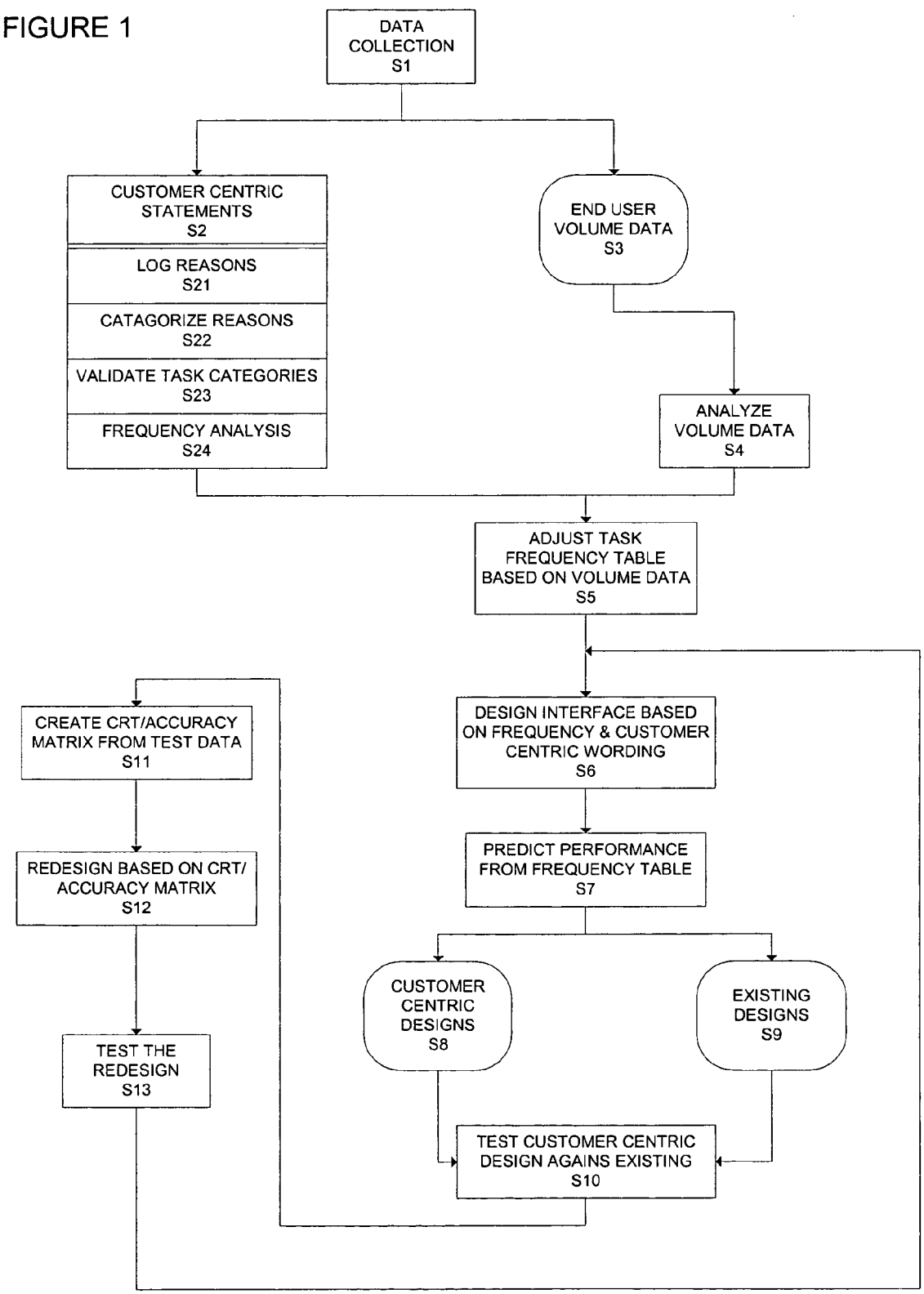
FIG. 1 is a flowchart representing the C-CAID methodology.

FIG. 1 is a flow chart of the customer-centric methodology flow. Step S1 is the initial data collection step where any data, information or metrics pertinent to the interface design is collected.

Table 1 shows a breakdown of the collected sample by call center type, the location of the call center facilities, and the number of calls collected from each call center site.

TABLE 1

Number of calls to small business call centers

| Call Center Type | Call Center Location | Number of Calls |
|---|---|---|
| AA | TX1 | 561 |
|  | AR1 | 222 |
|  | AA Subtotal = | 783 |
| NN | MO1 | 175 |
|  | TX2 | 31 |
|  | NN Subtotal = | 206 |

TABLE 1-continued

Number of calls to small business call centers

| Call Center Type | Call Center Location | Number of Calls |
|---|---|---|
| RR | TX3 | 195 |
|  | TX4 | 151 |
|  | OK1 | 77 |
|  | MO2 | 174 |
|  | RR Subtotal = | 597 |
| CC | MO2 | 495 |
|  | CC Subtotal = | 495 |
| MM | OK2 | 310 |
|  | MM Subtotal = | 310 |
|  | TOTAL | 2391 |

FIG. 1, step S21, shows that as the service representatives at these centers receive calls, they log the customer's opening statement or reason for calling using an IVR Call Log Sheet that can be found in Table 2.

As is readily apparent, utilizing a Call Log Sheet such as the one shown in Table 2, a service representative can easily record the reasons for customers calls, for a number of customers and the length of each call.

TABLE 2

Sample Call Log Sheet

| Small Business IVR Call Log Sheet Service Center: _____ CSR: _____ |  | Date: |
|---|---|---|
| Call | Reason/Purpose of Customers Call | Call Length (minutes) |
| Example: | "I'd like to find out the cost of adding two more business phone lines." | 3.5 |
| 1 |  |  |
| 2 |  |  |
| 3 |  |  |
| 4 |  |  |
| 5 |  |  |
| 6 |  |  |
| 7 |  |  |
| 8 |  |  |
| 9 |  |  |
| 10 |  |  |

The C-CAID is based upon on the user's representation of a task to be performed while interacting with a particular system interface. FIG. 1, step S2 indicates that user-centric statements should be applied to the design of the interface to assure that items are clearly mapped to the task options that the system can present to the user for selection. User-centric task statements are collected from a sample of users and categorized based on the tasks to be performed by the system.

Each task statement is classified or categorized into one of about seventy customer-centric task categories as shown in step S22 of FIG. 1. These customer-centric task categories were logically derived from a general consumer model. A general consumer model is a model based upon the potential tasks that a customer might require of an organization (e.g. telephone company), but does not have to be tailored to the unique organizational structure of a specific telephone company. Subcategories are generated to capture greater details of the lower level general task categories. The categories are then rank-ordered by the number of statements they represent. The IVR Call Log Sheets (Table 2) are electronically recorded and task categories are coded in spreadsheets for analysis. Examples of customer task statements are illustrated in Table 3. They show how many customer statements can be grouped into a higher level category that characterizes the same general information content.

It should be noted that the data collection method mentioned above can be performed either manually or automatically. Statistics can be accumulated via a data extraction or data collection algorithm designed to collect data without changing any of the intent, goals or effects of the present invention. This process automation can be applied to any of the steps found in the process flow diagram depicted in FIG. 1.

TABLE 3

Example customer statements to small business call centers.

| Call | Reason/Purpose of Customers Call | Task Category |
| --- | --- | --- |
| 1 | "I'd like to find out the cost of adding two more business phone lines." | Get information |
| 2 | "I want to order an ISDN line." | Acquire services |
| 3 | "I need some help on how to use call forwarding." | Information request |
| 4 | "I need to get someone to look at my broken phone." | Fix a service problem |
| 5 | "I called to check on my move orders." | Relocate service |

Before coding the customer task statements into task categories it is important to validate all of the task categories as shown in S23 of FIG. 1. Table 4 lists the different types of task categories than can be used in the design of the small business customer-centric IVR.

TABLE 4

Customer Statement Categorization list

Acquire Service

| | |
| --- | --- |
| A0- | Unspecified Addition |
| A1- | Request new phone service (Open an Account) |
| A2- | Add Optional Services |
| A3- | Schedule Pending Acquisition |
| A4- | Get Info about a Pending Acquisition |
| A5- | Give Info for a Pending Acquisition |
| A6- | Change a Pending Acquisition |
| A7- | Cancel a Pending Acquisition |
| A8- | Reconnect Service |
| A9- | Acquire Service Temporarily |

Discontinue Service

| | |
| --- | --- |
| D0- | Discontinue Unspecified Service |
| D1- | Disconnect (Close Account) |
| D2- | Discontinue Optional Service |
| D3- | Schedule a Pending Deletion |
| D4- | Get Info about a Pending Deletion |
| D5- | Give Info for a Pending Deletion |
| D6- | Change a Pending Deletion |
| D7- | Cancel a Pending Deletion |
| D9- | Discontinue Service Temporarily |
| D11 | Return a Product |

Fix a Service Problem

| | |
| --- | --- |
| F0- | Fix an unspecified problem |
| F1- | Fix a Service |
| F2- | Fix a Product |
| F3- | Schedule a Pending Repair |
| F4- | Get Info about a Pending Repair |
| F5- | Give Info about a Pending Repair |
| F6- | Change a Pending Repair |

TABLE 4-continued

Customer Statement Categorization list

| | |
| --- | --- |
| F7- | Cancel a Pending Repair |
| F8- | Report a Problem |
| F9- | Fix a Problem |

Relocate Service

| | |
| --- | --- |
| M0- | Move unspecified items (I'm moving.) |
| M1- | Request a Move of Service |
| M3- | Schedule a Pending Move |
| M4- | Get Info about a Pending Move |
| M5- | Give Info for the Pending Move |
| M6- | Change a Pending Move |
| M7- | Cancel a Pending Move |
| M9- | Move Service Temporarily |

Change Account Information, Services, or Service Features

| | |
| --- | --- |
| C0- | Change Unspecified |
| C1- | Change Account Data |
| C2- | Change Optional Services |
| C8- | Change a Feature of a Service |
| C9- | Make a Temporary Change |

Bill Issues

| | |
| --- | --- |
| B0- | Unspecified issue with the Bill |
| B4- | Get Information about the Bill |
| B5- | Give Information for the Bill |
| B6- | Dispute the Bill |

Pay Arrangement or Report a Payment

| | |
| --- | --- |
| P0- | Inquire about Payment Options |
| P1- | Set Up Payment Arrangement |
| P2- | Where to Make a Payment |
| P3- | Schedule Payment |
| P4- | Get Info about a Pending Payment |
| P5- | Give Info for a Pending Payment |
| P6- | Change a Pending Payment |
| P7- | Cancel a Pending Payment |

Information Requests

| | |
| --- | --- |
| I0- | Nature of inquiry unspecified |
| I1- | On Services |
| I2- | My Account |
| I3- | Other Service Providers |
| I11- | Other Company Offices |
| I12- | Name/Address/Number |

Long Distance/Other Service Provider

| | |
| --- | --- |
| L1- | Add a Carrier/Provider |
| L2- | Restore a Carrier/Provider |
| L4- | Get Info from the Carrier/Provider |
| L5- | Give Info to the Carrier/Provider |
| L6- | Change Carrier/Provider |
| L7- | Cancel a Carrier/Provider |
| L8- | Billing Issue for a Carrier/Provider |
| L9- | Payment for a Carrier/Provider |
| L11- | PIC Letter |

Validation is the process whereby one tests all of the proposed call mapping categories to make sure that they adequately cover all of the reasons that a customer may call the organization for which the IVR is being developed. The interface designer wants to make sure that the IVR can handle any possible reason that a customer would be calling.

Different subsidiaries of a company may have different task categories than the ones used for the small business customer-centric IVR. The task categories listed in Table 4 were originally developed for the consumer customer-centric IVR. However, it may be necessary to test the proposed call mapping categories to make sure that they adequately cover all the reasons a customer calls the subsidiary for which the IVR is being developed. This process involves taking a sample of randomized, customer reasons for calling a center and mapping these reasons to the proposed categories. Going through this process allows the designer to amend the task categories to better fit the call center that will interface with the IVR. This approach allows adding or deleting various categories, reorganizing them entirely, or reorganizing any combination thereof.

The metrics tabulated in Table 5 through Table 9 illustrate the most frequent reasons that small business customers call the different call centers listed in Table 1.

TABLE 5

Why customers call AA.

| Category | Description | Category % |
|---|---|---|
| B4 | Get Information about the Bill | 33.9% |
| I2 | Get Information on my Account | 17.5% |
| C1 | Change Account Data | 6.8% |
| D1 | Disconnect (Close Account) | 5.4% |
| B6 | Dispute the Bill | 5.3% |
| I1 | Get Information on Services | 4.7% |
| D2 | Discontinue Optional Service | 3.7% |
| A2 | Addition Optional Services | 2.6% |
| P4 | Get Info about a Pending Payment | 2.6% |
| L6 | Change Carrier/Provider | 2.1% |
| I11 | Get Information on other Company Offices | 1.8% |
| L2 | Restore a Carrier/Provider | 1.3% |
| P1 | Set Up Payment Arrangement | 1.3% |
| A8 | Reconnect Service | 1.2% |
| P5 | Give Info for a Pending Payment | 1.2% |
| F1 | Fix a Service | 1.1% |
| P0 | Inquire about Payment Options | 0.9% |
| D4 | Get Info about a Pending Deletion | 0.8% |
| I0 | Nature of inquiry unspecified | 0.8% |
| I12 | Get Information on a Name/Address/Number | 0.8% |
| M1 | Request a Move of Service | 0.8% |
| C2 | Change Optional Services | 0.7% |
| L7 | Cancel a Carrier/Provider | 0.7% |
| A4 | Get Info about a Pending Acquisition | 0.4% |
| A1 | Request new phone service | 0.3% |
| L5 | Give Info to the Carrier/Provider | 0.3% |
| P3 | Schedule Payment | 0.3% |
| A5 | Give Info for a Pending Acquisition | 0.1% |
| C8 | Change a Feature of a Service | 0.1% |
| D9 | Discontinue Service Temporarily | 0.1% |
| F2 | Fix a Product | 0.1% |
| F8 | Report a Problem | 0.1% |
| L4 | Get Info from the Carrier/Provider | 0.1% |
| M4 | Get Info about a Pending Move | 0.1% |
| P2 | Where to Make a Payment | 0.1% |
|  | Total | 100.0% |
| A0 | Unspecified Addition | 0.0% |
| A3 | Schedule Pending Acquisition | 0.0% |
| A6 | Change a Pending Acquisition | 0.0% |
| A7 | Cancel a Pending Acquisition | 0.0% |
| A9 | Acquire Service Temporarily | 0.0% |
| B5 | Give Information for the Bill | 0.0% |
| C0 | Change Unspecified | 0.0% |
| D0 | Discontinue Unspecified Service | 0.0% |
| D11 | Return a Product | 0.0% |
| D5 | Give Info for a Pending Deletion | 0.0% |
| F0 | Fix an unspecified problem | 0.0% |
| F3 | Schedule a Pending Repair | 0.0% |
| F9 | Fix a Problem | 0.0% |
| I3 | Get Information on other Service Providers | 0.0% |
| L1 | Add a Carrier/Provider | 0.0% |
| L11 | PIC Letter | 0.0% |
| L8 | Billing Issue for a Carrier/Provider | 0.0% |
| M5 | Give Info for the Pending Move | 0.0% |
| M9 | Move Service Temporarily | 0.0% |

TABLE 6

Why customers call CC.

| Category | Description | Category % |
|---|---|---|
| L6 | Change Carrier/Provider | 29.5% |
| I2 | Get Information on my Account | 20.5% |
| L4 | Get Info from the Carrier/Provider | 10.6% |
| B4 | Get Information about the Bill | 6.9% |
| L2 | Restore a Carrier/Provider | 6.0% |
| I1 | Get Information on Services | 5.4% |
| L7 | Cancel a Carrier/Provider | 4.3% |
| L1 | Add a Carrier/Provider | 2.6% |
| B6 | Dispute the Bill | 2.2% |
| C1 | Change Account Data | 1.9% |
| A2 | Add Optional Services | 1.7% |
| C2 | Change Optional Services | 1.1% |
| I11 | Get Information on other Company Offices | 1.1% |
| L5 | Give Info to the Carrier/Provider | 1.1% |
| D2 | Discontinue Optional Service | 0.9% |
| A4 | Get Info about a Pending Acquisition | 0.6% |
| A1 | Request new phone service | 0.4% |
| F1 | Fix a Service | 0.4% |
| I12 | Get Information on a Name/Address/Number | 0.4% |
| P4 | Get Info about a Pending Payment | 0.4% |
| A7 | Cancel a Pending Acquisition | 0.2% |
| D11 | Return a Product | 0.2% |
| F9 | Fix a Problem | 0.2% |
| I3 | Get Information on other Service Providers | 0.2% |
| L8 | Billing Issue for a Carrier/Provider | 0.2% |
| M1 | Request a Move of Service | 0.2% |
| P1 | Set Up Payment Arrangement | 0.2% |
| P5 | Give Info for a Pending Payment | 0.2% |
|  | Total | 100.0% |
| A0 | Unspecified Addition | 0.0% |
| A3 | Schedule Pending Acquisition | 0.0% |
| A5 | Give Info for a Pending Acquisition | 0.0% |
| A6 | Change a Pending Acquisition | 0.0% |
| A8 | Reconnect Service | 0.0% |
| A9 | Acquire Service Temporarily | 0.0% |
| B5 | Give Information for the Bill | 0.0% |
| C0 | Change Unspecified | 0.0% |
| C8 | Change a Feature of a Service | 0.0% |
| D0 | Discontinue Unspecified Service | 0.0% |
| D1 | Disconnect (Close Account) | 0.0% |
| D4 | Get Info about a Pending Deletion | 0.0% |
| D5 | Give Info for a Pending Deletion | 0.0% |
| D9 | Discontinue Service Temporarily | 0.0% |
| F0 | Fix an unspecified problem | 0.0% |
| F2 | Fix a Product | 0.0% |
| F3 | Schedule a Pending Repair | 0.0% |
| F8 | Report a Problem | 0.0% |
| I0 | Nature of inquiry unspecified | 0.0% |
| L11 | PIC Letter | 0.0% |
| M4 | Get Info about a Pending Move | 0.0% |
| M5 | Give Info for the Pending Move | 0.0% |
| M9 | Service Temporarily Move | 0.0% |
| P0 | Inquire about Payment Options | 0.0% |
| P2 | Where to Make a Payment | 0.0% |
| P3 | Schedule Payment | 0.0% |

TABLE 7

Why Customers call RR.

| Category | Description | Frequency % |
|---|---|---|
| I1 | Get Information on Services | 20.4% |
| A2 | Add Optional Services | 16.9% |
| I2 | Get Information on my Account | 8.4% |
| C1 | Change Account Data | 7.1% |
| A4 | Get Info about a Pending Acquisition | 5.4% |
| D2 | Discontinue Optional Service | 4.7% |
| D1 | Disconnect (Close Account) | 3.8% |

TABLE 7-continued

Why Customers call RR.

| Category | Description | Frequency % |
|---|---|---|
| C2 | Change Optional Services | 3.3% |
| I11 | Get Information on other Company Offices | 3.0% |
| M1 | Request a Move of Service | 3.0% |
| B4 | Get Information about the Bill | 2.8% |
| L6 | Change Carrier/Provider | 2.6% |
| F1 | Fix a Service | 2.4% |
| A1 | Request new phone service | 1.9% |
| A5 | Give Info for a Pending Acquisition | 1.9% |
| A8 | Reconnect Service | 1.6% |
| L5 | Give Info to the Carrier/Provider | 1.6% |
| L1 | Add a Carrier/Provider | 1.2% |
| C8 | Change a Feature of a Service | 1.0% |
| B6 | Dispute the Bill | 0.9% |
| A7 | Cancel a Pending Acquisition | 0.7% |
| L4 | Get Info from the Carrier/Provider | 0.5% |
| A3 | Schedule Pending Acquisition | 0.3% |
| D4 | Get Info about a Pending Deletion | 0.3% |
| D5 | Give Info for a Pending Deletion | 0.3% |
| L2 | Restore a Carrier/Provider | 0.3% |
| M4 | Get Info about a Pending Move | 0.3% |
| P2 | Where to Make a Payment | 0.3% |
| P5 | Give Info for a Pending Payment | 0.3% |
| A0 | Unspecified Addition | 0.2% |
| A6 | Change a Pending Acquisition | 0.2% |
| A9 | Acquire Service Temporarily | 0.2% |
| B5 | Give Information for the Bill | 0.2% |
| C0 | Change Unspecified | 0.2% |
| D0 | Discontinue Unspecified Service | 0.2% |
| D9 | Discontinue Service Temporarily | 0.2% |
| F2 | Fix a Product | 0.2% |
| F3 | Schedule a Pending Repair | 0.2% |
| F8 | Report a Problem | 0.2% |
| L11 | PIC Letter | 0.2% |
| M5 | Give Info for the Pending Move | 0.2% |
| M9 | Service Temporarily Move | 0.2% |
| P0 | Inquire about Payment Options | 0.2% |
|  | Total | 100.0% |
| D11 | Return a Product | 0.0 |
| F0 | Fix an unspecified problem | 0.0 |
| F9 | Fix a Problem | 0.0 |
| I0 | Nature of inquiry unspecified | 0.0 |
| I12 | Get Information on a Name/Address/Number | 0.0 |
| I3 | Get Information on other Service Providers | 0.0 |
| L7 | Cancel a Carrier/Provider | 0.0 |
| L8 | Billing Issue for a Carrier/Provider | 0.0 |
| P1 | Set Up Payment Arrangement | 0.0 |
| P3 | Schedule Payment | 0.0 |
| P4 | Get Info about a Pending Payment | 0.0 |
|  | Total | 100.0 |

TABLE 8

Why customers calls MM.

| Category | Description | Frequency % |
|---|---|---|
| I1 | Get Information on Services | 36.1 |
| I11 | Get Information on other Company Offices | 14.0 |
| A2 | Add Optional Services | 13.7 |
| I2 | Get Information on my Account | 6.0 |
| A4 | Get Info about a Pending Acquisition | 5.3 |
| B4 | Get Information about the Bill | 3.2 |
| M1 | Request a Move of Service | 3.2 |
| F1 | Fix a Service | 2.1 |
| F2 | Fix a Product | 2.1 |
| C1 | Change Account Data | 1.8 |
| A1 | Request new phone service | 1.4 |
| C2 | Change Optional Services | 1.4 |
| D2 | Discontinue Optional Service | 1.4 |
| M4 | Get Info about a Pending Move | 1.4 |
| D11 | Return a Product | 1.1 |
| L4 | Get Info from the Carrier/Provider | 1.1 |
| A3 | Schedule Pending Acquisition | 0.7 |
| A5 | Give Info for a Pending Acquisition | 0.7 |
| C8 | Change a Feature of a Service | 0.7 |
| F0 | Fix an unspecified problem | 0.7 |
| A8 | Reconnect Service | 0.4 |
| A9 | Acquire Service Temporarily | 0.4 |
| D1 | Disconnect (Close Account) | 0.4 |
| F8 | Report a Problem | 0.4 |
| M5 | Give Info for the Pending Move | 0.4 |
| P5 | Give Info for a Pending Payment | 0.4 |
|  | Total | 100.0 |
| A0 | Unspecified Addition | 0.0 |
| A6 | Change a Pending Acquisition | 0.0 |
| A7 | Cancel a Pending Acquisition | 0.0 |
| B5 | Give Information for the Bill | 0.0 |
| B6 | Dispute the Bill | 0.0 |
| C0 | Change Unspecified | 0.0 |
| D0 | Discontinue Unspecified Service | 0.0 |
| D4 | Get Info about a Pending Deletion | 0.0 |
| D5 | Give Info for a Pending Deletion | 0.0 |
| D9 | Discontinue Service Temporarily | 0.0 |
| F3 | Schedule a Pending Repair | 0.0 |
| F9 | Fix a Problem | 0.0 |
| I0 | Nature of inquiry unspecified | 0.0 |
| I12 | Get Information on a Name/Address/Number | 0.0 |
| I3 | Get Information on other Service Providers | 0.0 |
| L1 | Add a Carrier/Provider | 0.0 |
| L11 | PIC Letter | 0.0 |
| L2 | Restore a Carrier/Provider | 0.0 |
| L5 | Give Info to the Carrier/Provider | 0.0 |
| L6 | Change Carrier/Provider | 0.0 |
| L7 | Cancel a Carrier/Provider | 0.0 |
| L8 | Billing Issue for a Carrier/Provider | 0.0 |
| M9 | Service Temporarily Move | 0.0 |
| P0 | Inquire about Payment Options | 0.0 |
| P1 | Set Up Payment Arrangement | 0.0 |
| P2 | Where to Make a Payment | 0.0 |
| P3 | Schedule Payment | 0.0 |
| P4 | Get Info about a Pending Payment | 0.0 |

TABLE 9

Why customers call NN.

| Category | Description | Frequency % |
|---|---|---|
| A1 | Request a new phone service | 20.1 |
| I1 | Get Information on Services | 18.0 |
| M1 | Request a Move of Service | 10.1 |
| A2 | Add Optional Services | 7.4 |
| B4 | Get Information about the Bill | 7.4 |
| I2 | Get Information on my Account | 6.3 |
| A4 | Get Info about a Pending Acquisition | 4.8 |
| C1 | Change Account Data | 4.8 |
| D1 | Disconnect (Close Account) | 3.7 |
| C2 | Change Optional Services | 2.1 |
| A3 | Schedule Pending Acquisition | 1.6 |
| I11 | Get Information on other Company Offices | 1.6 |
| L4 | Get Info from the Carrier/Provider | 1.6 |
| M5 | Give Info for the Pending Move | 1.6 |
| A5 | Give Info for a Pending Acquisition | 1.1 |
| D4 | Get Info about a Pending Deletion | 1.1 |
| L6 | Change Carrier/Provider | 1.1 |
| M4 | Get Info about a Pending Move | 1.1 |
| A8 | Reconnect Service | 0.5 |
| A9 | Acquire Service Temporarily | 0.5 |
| B6 | Dispute the Bill | 0.5 |
| D2 | Disconnect Optional Service | 0.5 |

TABLE 9-continued

Why customers call NN.

| Category | Description | Frequency % |
|---|---|---|
| F2 | Fix a Product | 0.5 |
| I0 | Nature of inquiry unspecified | 0.5 |
| P1 | Set Up Payment Arrangement | 0.5 |
| P4 | Get Info about a Pending Payment | 0.5 |
| P5 | Give Info for a Pending Payment | 0.5 |
|  | Total | 100.0 |
| A0 | Unspecified Addition | 0.0 |
| A6 | Change a Pending Acquisition | 0.0 |
| A7 | Cancel a Pending Acquisition | 0.0 |
| B5 | Give Information for the Bill | 0.0 |
| C0 | Change Unspecified | 0.0 |
| C8 | Change a Feature of a Service | 0.0 |
| D0 | Discontinue Unspecified Service | 0.0 |
| D11 | Return a Product | 0.0 |
| D5 | Give Info for a Pending Deletion | 0.0 |
| D9 | Discontinue Service Temporarily | 0.0 |
| F0 | Fix an unspecified problem | 0.0 |
| F1 | Fix a Service | 0.0 |
| F3 | Schedule a Pending Repair | 0.0 |
| F8 | Report a Problem | 0.0 |
| F9 | Fix a Problem | 0.0 |
| I12 | Get Information on a Name/Address/Number | 0.0 |
| I3 | Get Information on other Service Providers | 0.0 |
| L1 | Add a Carrier/Provider | 0.0 |
| L11 | PIC Letter | 0.0 |
| L2 | Restore a Carrier/Provider | 0.0 |
| L5 | Give Info to the Carrier/Provider | 0.0 |
| L7 | Cancel a Carrier/Provider | 0.0 |
| L8 | Billing Issue for a Carrier/Provider | 0.0 |
| M9 | Move Service Temporarily | 0.0 |
| P0 | Inquire about Payment Options | 0.0 |
| P2 | Where to Make a Payment | 0.0 |
| P3 | Schedule Payment | 0.0 |

A customer-centric design approach takes the most frequent reasons and uses them as guidance to identify and define the arrangement of menu topics to reflect this frequency of occurrence.

Table 5 illustrates the task categories or reasons that customers call center AA. The most frequent category is to "Get Information About the Bill and accounts for 33.9% of the calls. The second most frequent task category occurs in only 17.5% of the calls ("Get Information On My Account"). For the task categories with a frequency above 1.0%, 6 of them are about "Information" and account for 61.7% of the customer calls. This suggests that "Information" should be the prominent topic in a customer-centric IVR menu for small, business customer calls to call center AA.

Table 6 illustrates the task categories or reasons that customers call center CC. The top category is to "Change Carrier/Provider" and accounts for 29.5% of the customer calls. The second most frequent task category accounts for 20.5% of the customer calls ("Get Information On My Account"). For the task categories with a frequency above 1.0%, 5 are about "Information" and account for 44.5% of the customer calls, and 5 are about "Carriers" and account for 43.2% of the customer calls. This suggests that "Information" and topics relating to "Carriers" should be prominent topics in a customer-centric IVR menu for customer calls to the call center designated as CC.

Table 7 illustrates the task categories or reasons that customers call RR. The top category is to "Get Information on Services" and accounts for 20.4% of the customer calls. The second most frequent task category called is add optional services and accounts for 16.9% of the customer calls. For the task categories with a frequency above 1.0%, 5 are about "information" and account for 40.0% of the customer calls; 3 are about "optional services" and account for 24.9% of the customer calls. This suggests that "information" and topics relating to "optional services" should be prominent topics in a customer-centric IVR menu for customer calls to call center RR.

Table 8 illustrates the task categories or reasons that customers call MM. The top category is to "Get Information on Services" and accounts for 36.1% of the customer calls. The second most frequent task category is to get information about other company services and accounts for 14.0% of the customer calls. The third most frequent category is to add optional services and accounts for 13.7% of the customer calls. For the task categories greater than 1.0%, 7 are about "information" and account for 67.1% of the customer calls. This suggests that "information" should be the prominent topic in a customer-centric IVR menu for customer calls to center MM.

Table 9 illustrates the task categories or reasons that customers call NN. The top category is to "Request New Phone Service" and accounts for 20.1% of the customer calls. The second most frequent task category is to get information about services and accounts for 18.0% of the customer calls. The third most frequent category is to request a move of services and accounts for 10.1% of the customer calls. For these task categories, 7 are about "information" and account for 40.8% of the customer calls; 4 are about "services" and account for 39.7% of the customer calls. This; suggests that "information" and topics relating to "services" should be prominent topics in a customer-centric IVR menu for customer calls NN.

An important part of the data collection process shown in FIG. 1 step S1 is to collect end-user volume data as shown in step S3 and to analyze the volume data as shown in step S4.

Often an IVR designer wants to provide customers with a single access telephone number that can be used for many or all of the centers. Such an arrangement reduces misdirected calls because the end user or customer will not have to guess which of the many company telephone numbers to call. So the question becomes, what if one combines the AA, NN, RR, CC and MM call centers by use of a single customer-access telephone number. In other words, what would the customer-centric call frequency show? To accurately depict a combined and adjusted task frequency as shown in FIG. 1 step S5 across the various call centers it is important to consider the call volume generated to each center. Call volume for each call center in the sample is used to weight the frequency of its different task categories. This is done because a call center that handles billing may get twice as much call volume per year compared with a call center that processes new orders. This volume weighting adjusts task category percentages to account for different call volumes and provides a more accurate analysis of task frequency.

The first step in adjusting task frequency for call volume is to consider total call volume for each small business center. First total call volume for each small business call center in a sample is obtained. Based upon data obtained from call volume during a predetermined time period, AA had approximately 610,059 calls, CC had approximately 51,374 calls, RR had approximately 573,871 calls, MM had approximately 40,260 calls, and NN had approximately 308,161 calls. This indicates a 39% weight for AA, a 1–9% weight for NN, a 36% weight for RR, a 3% weight for CC, and a 3% weight for MM. Table 10 illustrates the relative call volume of the different small business call centers.

TABLE 10

Relative call volume of different small business call centers.

| Small Business Call Center | Calls Received During Time Period | Relative Call Volume |
| --- | --- | --- |
| AA | 610,059 | 39% |
| NN | 308,161 | 19% |
| RR | 573,871 | 36% |
| CC | 51,374 | 3% |
| MM | 40,260 | 3% |
| Total | 1,583,725 | 100% |

After call volume weights have been computed, task frequency for each call center type is adjusted by multiplying task frequency by the call volume weight. Table 11 illustrates the steps involved in computing adjusted task frequency based upon volume data, as shown in step S5 of FIG. 1.

TABLE 11

Example computation of adjusted task frequency based on relative call volume.

| Task Categories | AA % | AA Call Vol Wght | AA Adj Freq | NN Adj Freq | RR Adj Freq | CC Adj Freq | MM Adj Freq | Overall Adj Task Freq |
| --- | --- | --- | --- | --- | --- | --- | --- | --- |
| Get information about the bill | .34 | .39 | 13.2% | 1.4% | 1.0% | 0.2% | 0.1% | 15.9% |
| Get information on services | .05 | .39 | 1.8% | 3.4% | 7.3% | 0.2% | 1.1% | 13.8% |
| Get information on my account | .18 | .39 | 6.8% | 1.2% | 3.0% | 0.6% | 0.2% | 11.8% |

The first column shows the task categories to be adjusted by call volume. As an example we will consider the first row task category "Get Information About the Bill". The second column in Table 11 (AA %) represents the percentage of calls made to AA for each task category. In this case, 33.9% of the calls to AA were to "Get Information About the Bill" (see Table 3). The third column in Table 11 (AA weight volume) represents the relative call volume weighting for AA. As shown in Table 10, the relative call weighting for AA was 39%. Column 4 shows the adjusted task frequency which was computed by multiplying the percentage of calls relating to "Get Information About the Bill" by the relative call volume weight. In this example, the adjusted frequency for calls to AA relating to "Get information about the bill" is 13:2% (i.e., 33.9%*39.0%=12.9%). These steps were also performed for the other small business call centers to obtain the adjusted task frequency values in columns 5–8. The adjusted task frequencies for each call center type are then summed to obtain the overall adjusted task category frequency which is represented in the last column (i.e., column 9) of Table 11. To complete the example, the overall adjusted task frequency for "Get Information About the Bill" is approximately 15.9% (i.e., 13.2%+1.4%+1.0%+0.2%+0.1%).

The results appear in Table 12 and show the adjusted task category frequencies or reasons customers called all Small Business centers after adjusting or compensating for differences in call volume.

TABLE 12

Why customers call AA, CC, RR, NN and MM.

| Category | Description | Combined % |
| --- | --- | --- |
| B4 | Get Information about the Bill | 15.92% |
| I1 | Get Information on Services | 13.85% |
| I2 | Get Information on my Account | 11.82% |
| A2 | Add Optional Services | 8.98% |
| C1 | Change Account Data | 6.25% |
| A1 | Request new phone service | 4.67% |
| D1 | Disconnect (Close Account) | 4.19% |
| M1 | Request a Move of Service | 3.38% |
| D2 | Discontinue Optional Service | 3.30% |
| A4 | Get Info about a Pending Acquisition | 3.18% |
| L6 | Change Carrier/Provider | 2.85% |
| I11 | Get Information on other company Offices | 2.54% |
| B6 | Dispute the Bill | 2.53% |
| C2 | Change Optional Services | 1.92% |
| F1 | Fix a Service | 1.36% |

TABLE 12-continued

Why customers call AA, CC, RR, NN and MM.

| Category | Description | Combined % |
| --- | --- | --- |
| P4 | Get Info about a Pending Payment | 1.14% |
| A8 | Reconnect Service | 1.14% |
| A5 | Give Info for a Pending Acquisition | 0.96% |
| L4 | Get Info from the Carrier/Provider | 0.89% |
| L2 | Restore a Carrier/Provider | 0.82% |
| P5 | Give Info for a Pending Payment | 0.70% |
| L5 | Give Info to the Carrier/Provider | 0.70% |
| D4 | Get Info about a Pending Deletion | 0.63% |
| P1 | Set Up Payment Arrangement | 0.62% |
| L1 | Add a Carrier/Provider | 0.52% |
| C8 | Change a Feature of a Service | 0.45% |
| A3 | Schedule Pending Acquisition | 0.45% |
| P0 | Inquire about Payment Options | 0.42% |
| M4 | Get Info about a Pending Move | 0.42% |
| I0 | Nature of inquiry unspecified | 0.41% |
| L7 | Cancel a Carrier/Provider | 0.39% |
| M5 | Give Info for the Pending Move | 0.37% |
| I12 | Get Information on a Name/Address/Number | 0.32% |
| F2 | Fix a Product | 0.28% |
| A7 | Cancel a Pending Acquisition | 0.26% |
| P2 | Where to Make a Payment | 0.18% |
| A9 | Acquire Service Temporarily | 0.17% |
| D5 | Give Info for a Pending Deletion | 0.13% |
| F8 | Report a Problem | 0.12% |
| D9 | Discontinue Service Temporarily | 0.11% |
| P3 | Schedule Payment | 0.10% |
| A0 | Unspecified Addition | 0.06% |
| A6 | Change a Pending Acquisition | 0.06% |
| B5 | Give Information for the Bill | 0.06% |

TABLE 12-continued

Why customers call AA, CC, RR, NN and MM.

| Category | Description | Combined % |
|---|---|---|
| C0 | Change Unspecified | 0.06% |
| D0 | Discontinue Unspecified Service | 0.06% |
| F3 | Schedule a Pending Repair | 0.06% |
| L11 | PIC Letter | 0.06% |
| M9 | Service Temporarily Move | 0.06% |
| D11 | Return a Product | 0.04% |
| F0 | Fix an unspecified problem | 0.02% |
| F9 | Fix a Problem | 0.01% |
| I3 | Get Information on other Service Providers | 0.01% |
| L8 | Billing Issue for a Carrier/Provider | 0.01% |
| | Total | 100.0% |

As is evident, the top task category is "Get Information About the Bill", and it accounts for 15.92% of all calls. The next most frequent task category is "Get Information on Services", and it accounts for 13.85% of all calls. In fact, the top three reasons why customers call is to: 1) inquire about the monthly bill; 2) inquire about products, services and prices; or 3) inquire about their account. These three information inquiries are responsible for 41.59% of all calls. Further, among the task categories with a frequency greater than 1.0%, 6 are about "information" and account for 48.45% of all calls; and 8 task categories about "services" (i.e., new, changing, moving or disconnecting service) and account for 35.54%; of the customer calls. This suggests that tasks relating to "information" and "services" should be prominent topics when designing a customer-centric IVR menu for Small Business Call Centers.

Figure 4:
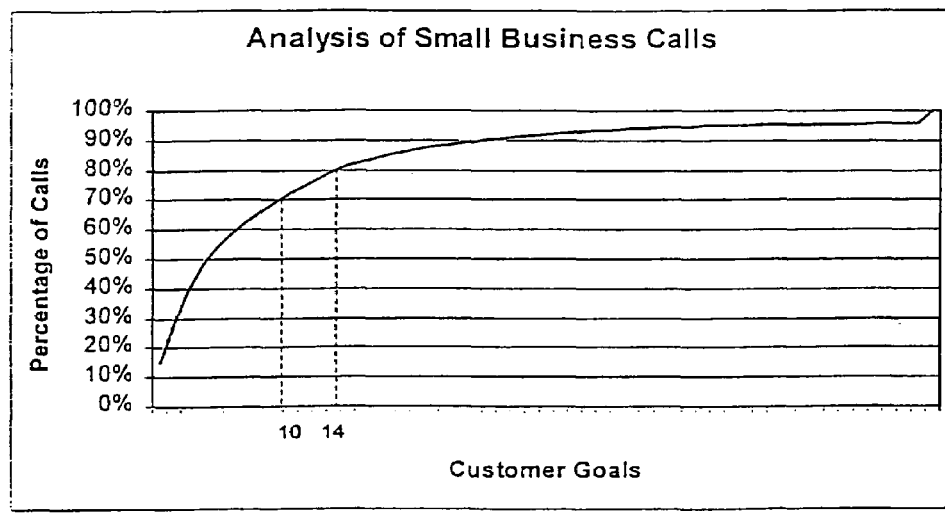
FIG. 4 shows the percentage of calls made to small-business centers.

As seen in FIG. 4, the top ten tasks or reasons customers call small business centers account for 72.2% of the calls in the sample and the top 14 tasks account for 81.6% of the calls. That is, the overwhelming majority of calls to small business centers can be categorized by less than 15 tasks. This means that when designing the IVR menu options S6, one should focus on high frequency tasks because they are the most likely to be of interest to and requested by the small business customers. The most frequent tasks are located early in the IVR menu selections to quickly address common calls; however, less frequent categories may be grouped with more frequent categories for logical reasons. For example, in the customer-centric design approach to the small business IVR, we combine the frequent task categories into menu options that are ordered by the percentage of calls for which they account (see Table 12). As noted above, there are six categories involving "Get Information." Three of them (rank orders 1, 2, and 3) concern either the customer's account, the bill or the products and services. These three account for 41.59% of the calls. Therefore, these tasks are used to word the Top-Level Menu "Get information about your account or our services". All categories relating to the "Get Information" option appear in an associated Second-Level Menu as shown in Table 13.

According to the data collected organized and analyzed as discussed above and as shown in the steps S1–S5 of FIG. 1 menu options of the interface are defined in step S6. A sample of such an IVR are shown in Table 13.

Table 13: Example Top-Level, Second-Level, and Third-Level IVR Menu Options.

| Top-Level Menu Choices | Second-Level Menu Choices | Third-Level Menu Choices |
|---|---|---|
| To get information about your account or our services and prices, press 1. | For information about an item on your bill, press 1. | For bill items other than DSL or ISDN, press 1. |
| | | For DSL bill items, press 2. |
| | | For ISDN bill items, press 3. |
| | | For DSL or ISDN bill items, press 4. |
| | | For all other billing questions, press 5. |
| | For information about our services, products, and prices, press 2. | If you have an existing account, press 1. |
| | | If you are a new account, press 2. |
| | For the information we have about your account, press 3. | |
| | For information about a repair or installation order, press 4. | For repair, press 1. |
| | | For installation, press 2. |
| | For information about an order for additional lines or services, press 5. | |
| | For information about high-speed data services, press 6. | For DSL, press 1. |
| | | For ISDN, press 2. |
| | | For all other questions about high-speed data services, press 3. |

Within any business, there is often an organizational need to route similar requests to different agents for task handling and execution. For example, staffing levels or specialization of training at different call centers may dictate distinguishing among similar generic tasks on some basis that may be transparent, irrelevant or unknown to the customer. In Small Business, for example, billing questions involving high-speed data products are handled separately by agents who are specialized by technology and according to other areas of expertise. Thus, the Second-Level option "Information About an Item On Your Bill" leads to a Third-Level Menu that differentiates ISDN and DSL and "other."

It should be noted that not all IVR menu categories are included in all IVR designs. For example, task categories such as "Get Information About a Pending Acquisition" and "Get Information About Other Company Offices" were not included as options in the current small business IVR although these items account for 5.2% of the call volume. These items were both included in the customer-centric IVR design.

As FIG. 1 step S7 shows, after the initial user-interface is designed, a prediction model based on expected user task volume and task frequency is used to provide an early indication of how the interface will perform. A predictive comparison of the newly designed system to the existing system is performed to estimate performance gains (see steps S8, S9 and S10 in FIG. 1). Prototypes of the system are then tested on a sample of users performing real-world scenarios (i.e., tasks) extracted from the initially collected customer-centric data.

In an effort to estimate the routing performance of the current IVR design as compared to the customer-centric design, a designer needs to directly compare predicted routing performance of both IVR designs. Estimates of correct call routing were predicted using 2 independent judges (i.e., testers). Each judge reviewed 24 task categories that each contained three real-world scenarios for a total of 72 scenarios. The scenarios were extracted from the initial 2391 customer-task statements that were collected from the customer call centers. The judges read each scenario and attempted to resolve it (i.e., correctly route it) using both the existing and newly designed customer-centric small business IVR. For example:

Task Category=Get information about the bill:
Scenario #1=I have a question about the charges on my bill.
Scenario #2=I need to know to who some of these numbers on my bill belong.
Scenario #3=I need to know the balance of my account.

Scores were converted to a "routing percentage score" by multiplying percent correct routing by the task frequency adjusted for call volume across call centers. For example, if the two judges examining scenarios correctly routed 5 of 6 scenarios within a task category, then the "routing percentage score" equaled 83.3%. Further, if the task category frequency adjusted for call volume across calling centers was 15.92% then the "Predicted Routing Percentage Score" would be 13.26% (i.e., 83.3%×15.92%=13.26%). The "Predicted Routing Percentage Scores" are multiplied and summed across the 24 task categories arrive at the overall predicted routing percentage for each IVR. These scores are used to estimate performance differences between the current small business IVR and the redesigned customer-centric small business IVR.

Table 14 describes the menu topics based on call frequency adjusted for call volume.

TABLE 14

Small business customer-centric menu topics based on frequency.

| General Topics | Specific Topics | Specific Task Code | Call Freq | Routing % Score | Predicted Score |
|---|---|---|---|---|---|
| Get Information | Get information about the bill | B4 | 15.92% | 100% | 15.92% |
| | Get information on services | I1 | 13.85% | 100% | 13.85% |
| | Get information on my account | I2 | 11.82% | 100% | 11.82% |
| | Get information about a pending acquisition | A4 | 3.18% | 100% | 3.18% |
| | Get information about other company offices | I11 | 2.54% | 33.3% | 0.84% |
| | Get information about a pending payment | P4 | 1.14% | 100% | 1.14% |
| | Get information about a carrier | L4 | 0.89% | 33.3% | 0.28% |
| | | Subtotal = | | | 47.03% |
| Change your account or change your services | Add optional services | A2 | 8.98% | 83.3% | 7.48% |
| | Change account information | C1 | 6.25% | 33.3% | 2.08% |
| | Delete optional services | D2 | 3.30% | 100% | 3.30% |
| | Request a move of service | M1 | 3.38% | 100% | 3.38% |
| | Change a carrier | L6 | 2.85% | 100% | 2.85% |
| | Change optional services | C2 | 1.92% | 100% | 1.92% |
| | Restore a carrier | L2 | 0.83% | 83.3% | 0.68% |
| | Get information | M5 | 0.37% | 33.3% | 0.12% |

TABLE 14-continued

Small business customer-centric menu topics based on frequency.

| General Topics | Specific Topics | Specific Task Code | Call Freq | Routing % Score | Predicted Score |
|---|---|---|---|---|---|
| | about a pending move Cancel or delete a carrier | L7 | 0.39% | 100% | 0.39% |
| | Add a carrier | L1 | 0.52% | 100% | 0.52% |
| | | Subtotal = | | | 22.72% |
| Open an account or disconnect services | Discontinue service | D1 | 4.19% | 100% | 4.19% |
| | Open a new account | A1 | 4.67% | 100% | 4.67% |
| | | Subtotal = | | | 8.86% |
| Repair | Fix a service | F1 | 1.36% | 100% | 1.36% |
| | Fix a product | F2 | 0.28% | 100% | 0.28% |
| | | Subtotal = | | | 1.64% |
| Discuss your bill or payments | Dispute the bill | B6 | 2.53% | 100% | 2.53% |
| | Make payment arrangement | P1 | 0.62% | 100% | 0.62% |
| | Reconnect service | A8 | 1.14% | 66.6% | 0.76% |
| | | Subtotal = | | | 3.91% |
| | | Grand Total = | | | 84.16% |

The "general" and "specific" columns represent the most frequent reasons why customers called small business centers. The "task code" column shows the identifier used when the calls were classified in designing the IVR. The "call frequency" column shows the percentage of calls that were for a particular task; this is the percentage of callers who called the center to accomplish this particular task. The "routing percent score" shows the percentage of tasks correctly routed by the two judges. The "predicted score" shows the theoretical prediction of routing performance based on the adjusted call frequency and the routing percentage score.

The results of the analysis provide support for the theoretical prediction that there will be an improvement in correct call routing performance by redesigning an existing small business IVR using a customer-centric approach. Specifically, the results of the analysis predict that the customer-centric design shown in Table 14 will correctly route approximately 84% of customers to the appropriate service center (see Grand Total of 84.16%). For comparison purposes, the predicted routing model was applied to the existing small business IVR. The analysis is shown in Table 15 and suggests that approximately 73% of the customers will be routed to the appropriate service center (see Grand Total of 73.00%) with the existing design. Therefore, a customer-centric approach has the potential to produce a significant increase (i.e., 84.16%-73.00%=11.16%) in the number of callers who are correctly routed. This comparison illustrates a primary recommended use of this approach—to compare related IVR designs as to their relative customer-centric operational performance.

TABLE 15

Existing Small Business IVR: Business-centric prompts, with frequency data.

| General Topics | Specific Topics | Specific Task Code | Call Freq | Routing % Score | Predicted Score |
|---|---|---|---|---|---|
| Orders and product information | Add or make changes to service | A2 | 8.98% | 100% | 8.98% |
| | | C2 | 1.92% | 100% | 1.92% |
| | | A8 | 1.14% | 50% | 0.57% |
| | | M5 | 0.37% | 66.6% | 0.25% |
| | Establish new service or move existing service | A1 | 4.67% | 100% | 4.67% |
| | | M1 | 3.38% | 100% | 3.38% |

TABLE 15-continued

Existing Small Business IVR: Business-centric prompts, with frequency data.

| General Topics | Specific Topics | Specific Task Code | Call Freq | Routing % Score | Predicted Score |
|---|---|---|---|---|---|
| | Telephone systems or equipment | 11 | 3.38% | 100% | 13.85% |
| | | Subtotal = | | | 3.62% |
| Billing Inquiries or change long distance carrier | Change long distance carrier | C1 | 6.25% | 16.7% | 1.04% |
| | | L6 | 2.85% | 33.3% | 0.95% |
| | | L2 | 0.82% | 100% | 0.82% |
| | | L1 | 0.52% | 100% | 0.52% |
| | | L7 | 0.39% | 100% | 0.39% |
| | Payment arrangements | P4 | 1.14% | 100% | 1.14% |
| | | P1 | 0.62% | 100% | 0.62% |
| | Completely disconnect service or all other billing questions | B4 | 15.92% | 100% | 15.92% |
| | | I2 | 11.82% | 100% | 11.82% |
| | | D2 | 3.30% | 33.3% | 1.10% |
| | | B6 | 2.53% | 100% | 2.53% |
| | | L4 | 0.89% | 100% | 0.89% |
| | | Subtotal = | | | 37.74% |
| Repair | Fix a product or service | F1 | 1.36% | 100% | 1.36% |
| | | F2 | 0.28 | 100% | 0.25% |
| | | Subtotal = | | | 1.64% |
| | | Grand Total = | | | 73.00% |

The C-CAID approach to interface design has many tangible and useful results including increased user satisfaction and optimized system performance. One of the biggest problems associated with menu option systems is the occurrence of misdirected calls. These are incoming calls that are "misdirected" or incorrectly routed to the wrong servicing organization. Misdirected calls are a significant problem in both business and consumer markets. An example of the impact that these misdirected calls may have on a business is discussed below.

It is estimated that approximately 31% of the total calls to a company's small business call centers (i.e. AA, CC, RR, MM and NN) are misdirects. In 1998, there were approximately 6.2 million calls to those Small Business call centers, resulting in approximately 1.9 million misdirected calls. A recent study indicates that each misdirected call costs approximately $0.91. Thus, the annual cost of misdirected calls is approximately $1.75 million (1.9 million misdirected calls times $0.91 each). The projected cost savings achieved by implementing the customer-centric small business IVR design is estimated at $400,000 dollars based on the 25% predicted reduction in misdirects for the customer-centric small business IVR.

After design of the C-CAID based interface system, the system was tested. Participants in the test were instructed that they were to make two phone calls. One call was to the existing small business IVR and the second call was to the customer-centric IVR. Participants were presented with real-world tasks that were generated using example scenarios obtained from gathered data. Example tasks might require participants to obtain information about a bill or to order an optional phone service. Participants were told to select category options from either the current or redesigned IVR to resolve the particular scenario with which they were presented. After completing both phone calls, participants were administered a short questionnaire to assess their impression of each system. An example questionnaire can be found in FIG. 5. Internal administrations of this survey found that customers greatly preferred an IVR designed using the C-CAID methodology as opposed to ones that did not.

Two objective measures are used to evaluate the performance of the customer-centric IVR. These measures are cumulative response time (CRT) and a routing accuracy score and are described in detail below. This evaluation step is shown in FIG. 1 step S11.

Two objective measures are collected during usability testing. Cumulative response time (CRT) and task accuracy are used to evaluate performance of the systems. CRT is a measure of the time per task that end-users spend interacting with each system. Task accuracy is used to measure how effectively the goals of the end-user were mapped to each system via the user interface. These two metrics (CRT and task accuracy) are then graphed into a CRT/accuracy matrix (S11 of FIG. 1) that depicts end-user performance for these systems in a convenient and easy to understand manner. This CRT/accuracy matrix is a very powerful tool for the designer to evaluate the strengths and weaknesses of a specific interface design. The designer can observe and evaluate those specific tasks that the end-users are performing poorly while using the interface. From this evaluation, one can redesign the interface design in order to improve performance. If a particular task does not effectively map to the associated interface options then one can expect that the resulting accuracy of the navigation will be poor or higher CRTs will result. The CRT/accuracy matrix is instrumental in identifying the deficiencies of an existing interface system and then serves as a guide and feedback monitor to indicate how introduced changes positively or negatively impact the system as a result of the redesign activity (S12 of FIG. 1). The goal of the retesting efforts is to determine whether performance on the redesigned interface options improved and if the redesign negatively impacted unchanged aspects of the interface design.

To calculate the cumulative response time, the time in seconds that subject spends interacting with the IVR is measured. Participants (i.e., subjects) are not credited or penalized for listening to the entire IVR menu before making a selection. For example, if the main menu of the IVR is 30 seconds in length, and the participant listens to the whole menu and then makes a selection, they receive a CRT score of 0. If the participant only listens to part of a menu, hears their choice, and barges in, choosing an option before the whole menu plays, then they would receive a negative CRT score. For instance, if they choose option 3, fifteen seconds into a 6 option, 30 second menu, they would receive a CRT score of −15. Conversely, if they were to repeat the menu after hearing it once, and then chose option three on the second playing of that menu, they would receive a CRT score of +15 for that menu.

Figure 3:
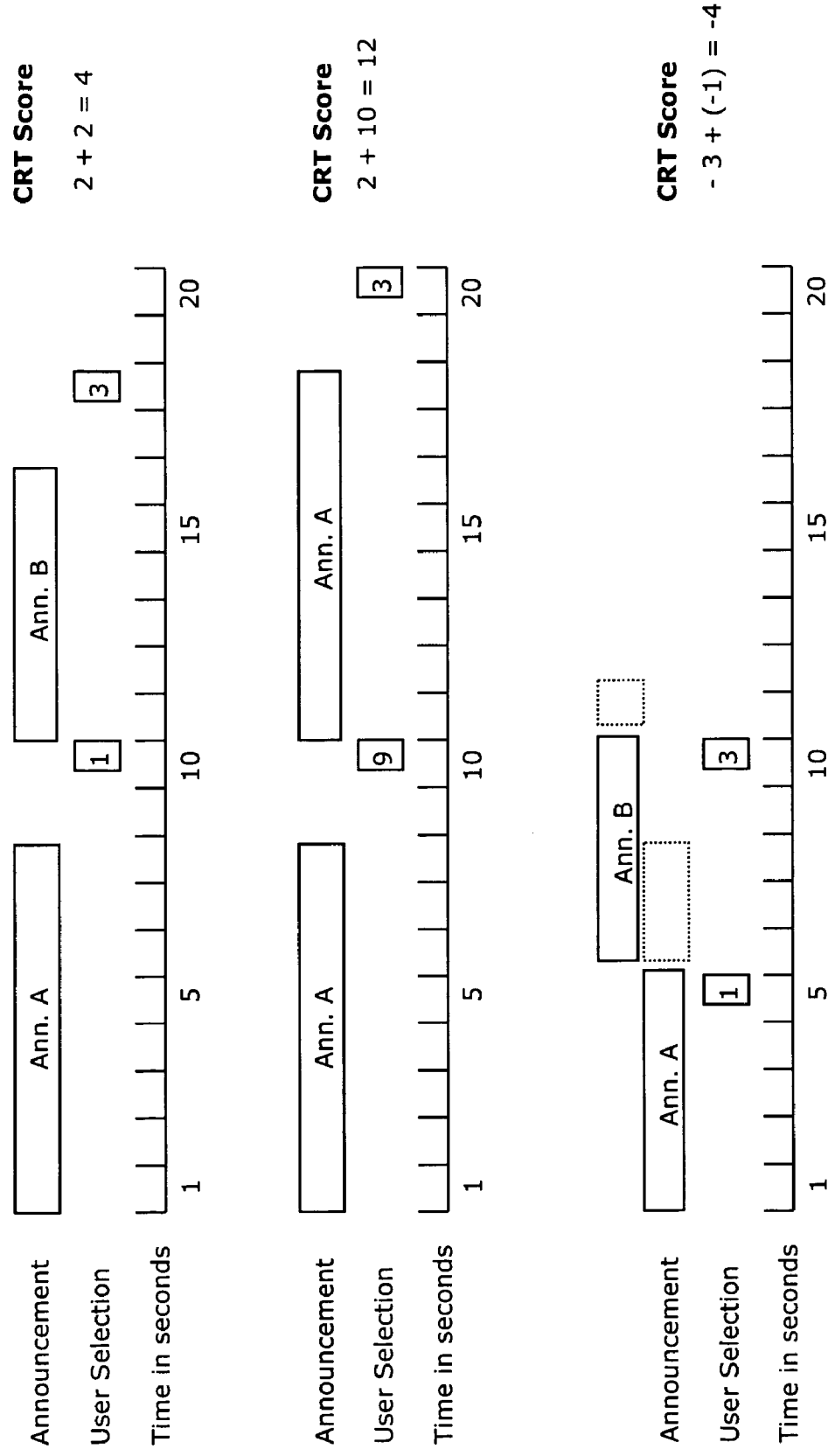
FIG. 3 shows a sample calculation of CRT.

Referring to the examples illustrated in FIG. 3, the first subject took two seconds after the end of each announcement to make the selection, resulting in a score of 4. The second subject repeated the announcement and made both selections after two seconds, resulting in a score of 12. The third subject made the selection before completion of each announcement and thus received a score of −4. Once the subject reaches their final destination in the IVR (regardless of accuracy), the CRT scores for each menu level are summed, and that becomes the total CRT score for that subject on that particular task. This metric accurately measures the total time a user is interfacing with the system, regardless of menu length.

Using this method, it was found that longer IVR menus don't necessarily mean that the participant spends more time in the system. In fact, the customer-centric consumer IVR has menus that measured approximately 90 seconds in length while the current consumer version's menus were about 30 seconds in length. However, CRT scores indicated that although the customer-centric design is almost 3 times longer than the current consumer IVR, the averaged CRT scores for both the customer-centric and current IVR's were not significantly different. The likely explanation for this could be that the subjects got better descriptions, with more detail, in the customer-centric design. Therefore, they did not need to repeat the menus as much.

Route scoring provider information as to whether or not the user is routed to the correct call center. A score of −1, 0, or 1 could be awarded for each task. A score of −1 indicates that a subject actively chose an IVR path that did not route them to the correct destination for the task that they were trying to complete. A score of 0 indicates that the subject got to a point in the IVR and made no selection either by hanging up or automatically timing out. Finally, a score of 1 indicates that the subject successfully navigated the IVR for a given task and was routed to the correct destination.

Figure 2:
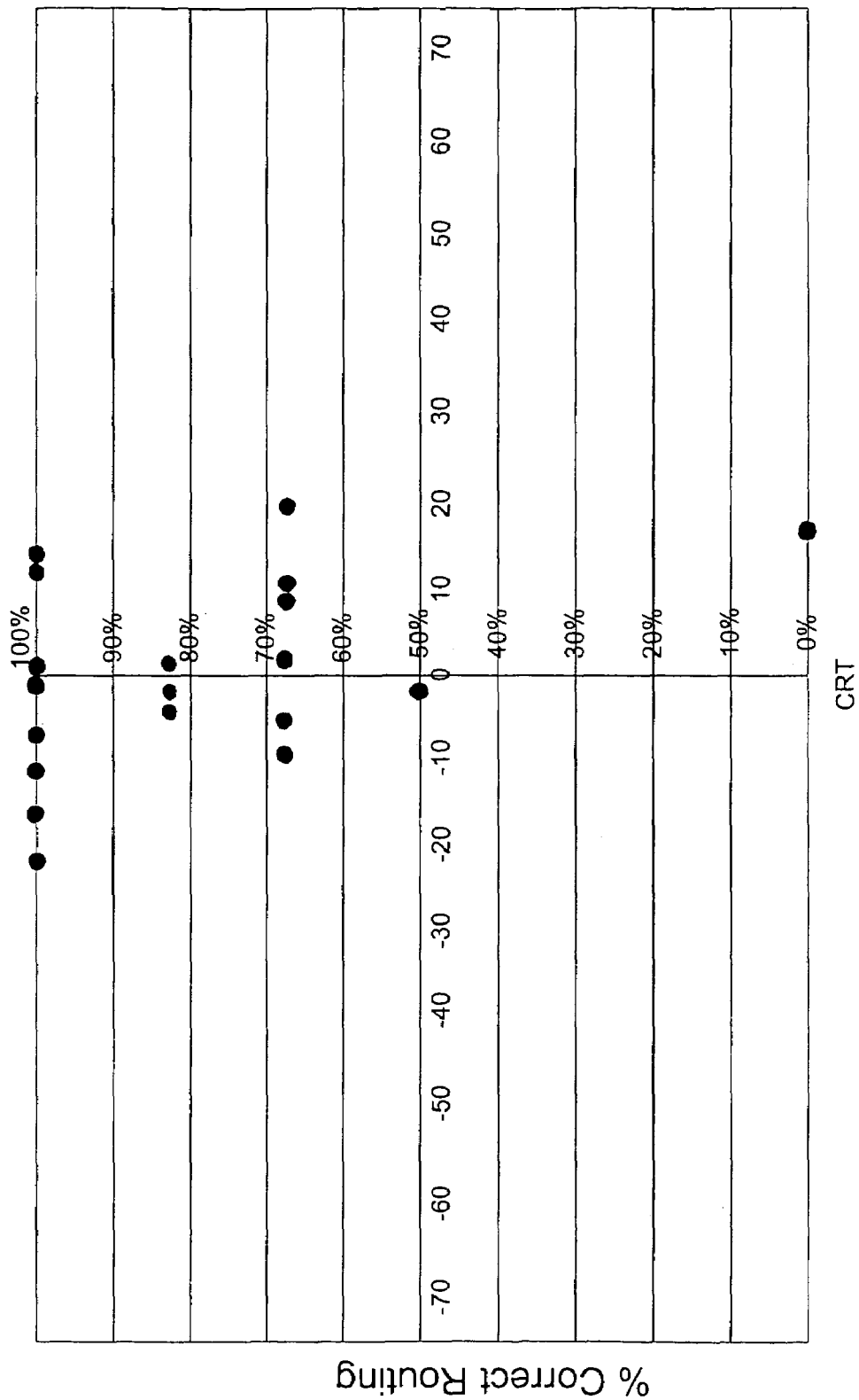
FIG. 2 is a representation of a CRT/Routing Matrix.

Both CRT and routing accuracy (i.e., route scoring) are used to create a CRT/Routing matrix that is used to estimate performance on specific IVR menu options. CRT is plotted on the Y axis and route scoring on the X axis. An example CRT/Routing matrix is depicted in FIG. 2. From this matrix one can determine which tasks are handled well by the IVR, and which tasks are not. Data points located in the upper left quadrant of the matrix are optimal performers because there was both high routing accuracy and a short CRT. In this case, the short CRT time shows that participants are confident that their selected task option matches their goal or reason for calling. Therefore, participants are "barging in" to the menuing system, spending less time with the IVR, and their call is correctly routed. In contrast, data points that fall in the lower right quadrant represent tasks that did not perform well because there was both poor routing accuracy and a long CRT. In this case, participants had to repeat the menus and still did not choose the correct menu options in the IVR.

As shown in FIG. 1, step S12, the CRT/routing matrix provides a powerful tool when it comes to evaluating the strengths and weaknesses of the IVR design. For example, a designer can look at the specific tasks that participants perform poorly, and redesign or reword aspects of these IVR menu choices in order to improve performance. That is, if a particular task does not effectively map to the associated menu option then one can expect poor routing accuracy or high CRT's. The CRT/routing matrix can be used to identify deficiencies and tweak the IVR design for optimal performance.

Pending completion of the redesigned IVR, the modified design is retested using a similar user sample as in the initial testing sample as shown in step S13 of FIG. 1. The purpose of the retest is to evaluate any changes made to the IVR based on results of the CRT/routing matrix. The goals of retesting efforts are to determine whether performance of the redesigned menu items improves and to determine whether changes made had negative impact on unchanged menus in the IVR. Evaluations of IVR-performance using the CRT/routing matrix and retesting are iterative processes and should continue until the design maximizes performance or improvement goals are met.

After the initial user-interface is designed, a prediction model based on expected user task volume and task frequency is used to provide an early indication of the how the interface will perform. This establishes a baseline interface that provides an indication of how the new interface will perform.

The newly designed interface is then compared to the previous one and performance gain estimates can be determined with respect to the previous interface.

The resulting system prototypes are then tested on a sample of users. The users perform real-world scenarios extracted from the initially collected customer-centric data to test the system.

As also shown in FIG. 1, upon completion of the redesign test (S13) an updated interface can be designed using the same principles by looping back to step S6 or to another appropriate point. Thus, the interface can be periodically improved.

While the invention has been described with reference to a preferred embodiment, it is understood that the words which have been used herein are words of description and illustration, rather than words of limitations. Changes may be made, without departing from the scope and spirit of the invention in its aspects. Although the invention has been described to a particular method, the invention is not intended to be limited to the particulars disclosed herein; rather, the invention extends to all functionally equivalent structures, methods and uses.

For example, the interface can be an interface between a user and a computer application or between a user and an e-mail system. Also, the interface can also be between two communicating machines or devices. The communications layers can be optimized so that the machines are set up optimally to communicate more statistically relevant tasks than those communications that may not occur as frequently. In addition, the updating of the design interface may be done at various time increments. Additionally, the information gathered is not limited to customer service requests for a telephonic system. The information can be the data gathered from an online e-commerce system that looks at those items or preferences that occur or are accessed more frequently by the end user.

Accordingly, the invention is now defined with respect to the attached claims.

What is claimed:

1. A method for designing an interface system, comprising:

determining frequency of task occurrence for a plurality of call centers;

determining an adjusted task frequency for each call center by multiplying a call volume weight for the call center by the task frequency for the call center;

determining an overall adjusted task frequency by summing each call center's adjusted task frequency; and categorizing tasks in accordance with the overall adjusted task frequency to design an interface system options menu.

2. The method according to claim 1, wherein user relevant terms, obtained from the call centers, are used in the menu options.

3. The method according to claim 1, further comprising evaluating the performance of the interface system by use of an analytic scoring model.

4. The method according to claim 1, in which categorizing the tasks further comprises grouping and ordering the menu options in accordance with the overall adjusted task frequency.

5. The method according to claim 4, in which categorizing the tasks further comprises ordering menu options so that higher frequency tasks are positioned higher in the sequence of options.

6. The method according to claim 1, wherein a prediction model based upon expected user task volume and task frequency is utilized to provide an indication of how the interface system will perform.

7. The method according to claim 1, wherein cumulative response time (CRT) and routing accuracy are used to evaluate performance of the interface system.

8. A computer readable medium storing a computer program for designing an interface system, comprising:

a task frequency code segment that determines a frequency of task occurrence for a plurality of call centers;

an adjusted task frequency code segment that determines an adjusted task frequency for each call center by multiplying a call volume weight for the call center by the task frequency for the call center;

an overall task frequency code segment that determines an overall adjusted task frequency by summing each call center's adjusted task frequency; and a categorizing code segment that categorizes tasks in accordance with the overall adjusted task frequency to design an interface system options menu.

9. The medium according to claim 8, wherein user relevant terms, obtained from the call centers, are used in the menu options.

10. The medium according to claim 8, further comprising a performance code segment that evaluates performance of the interface system with an analytic scoring model.

11. The medium according to claim 8, in which the categorizing code segment further groups and orders the menu options in accordance with the overall adjusted task frequency.

12. The medium according to claim 11, in which the categorizing code segment further orders menu options so that higher frequency tasks are positioned higher in the sequence of options.

13. The medium according to claim 8, further comprising a prediction model based upon expected user task volume and task frequency, the prediction model being utilized to provide an indication of how the interface system will perform.

14. The medium according to claim 8, further comprising a performance code segment that evaluates performance of the interface system using cumulative response time (ORT) and routing accuracy.

* * * * *

UNITED STATES PATENT AND TRADEMARK OFFICE
CERTIFICATE OF CORRECTION

| | | |
|---|---|---|
| PATENT NO. | : 7,076,049 B2 | Page 1 of 1 |
| APPLICATION NO. | : 10/882183 | |
| DATED | : July 11, 2006 | |
| INVENTOR(S) | : Bushey et al. | |

It is certified that error appears in the above-identified patent and that said Letters Patent is hereby corrected as shown below:

At column 28, line 36 (claim 14, line 3), "(ORT)" should be --(CRT)--.

Signed and Sealed this

Eighteenth Day of March, 2008

JON W. DUDAS
*Director of the United States Patent and Trademark Office*